(12) United States Patent
Niki et al.

(10) Patent No.: US 6,762,771 B1
(45) Date of Patent: *Jul. 13, 2004

(54) PRINTER DRIVER HAVING ADAPTABLE DEFAULT MODE

(75) Inventors: Toru Niki, Irvine, CA (US); Tsukasa Aiba, Irvine, CA (US)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 352 days.

(21) Appl. No.: 09/135,648

(22) Filed: Aug. 18, 1998

(51) Int. Cl.[7] .............................. G05G 5/00
(52) U.S. Cl. ............... 345/700; 358/1.13; 345/813
(58) Field of Search ....................... 345/326, 961, 345/965, 700, 866, 813; 358/1.13, 1.1

(56) References Cited

U.S. PATENT DOCUMENTS

| | | | | |
|---|---|---|---|---|
| 5,371,837 A | * | 12/1994 | Kimber et al. | 358/1.13 |
| 5,579,446 A | * | 11/1996 | Naik et al. | 347/43 |
| 5,680,521 A | | 10/1997 | Pardo et al. | 358/1.13 |
| 5,694,618 A | * | 12/1997 | Hibino | 710/14 |
| 5,748,980 A | * | 5/1998 | Lipe et al. | 710/8 |
| 5,958,022 A | * | 9/1999 | Wilhelm, Jr. | 710/14 |
| 6,014,714 A | * | 1/2000 | Plyler et al. | 710/8 |

OTHER PUBLICATIONS

HP DeskJet 540 Printer Configuration Setting, 1997.*

HP DeskJet Printers—HP DeskJet v 6.1 Driver Overview, 1997.*

* cited by examiner

*Primary Examiner*—Sy D. Luu
(74) *Attorney, Agent, or Firm*—Fitzpatrick, Cella, Harper & Scinto

(57) ABSTRACT

A device driver for use in a computer system includes process steps to detect data corresponding to at least one system resource of the computer system, to determine a default operational mode from a plurality of operational modes of a device based on the data corresponding to at least one system resource, and to provide a user interface for selecting an operational mode from the plurality of operational modes.

22 Claims, 8 Drawing Sheets

PRINTER DRIVER HAVING ADAPTABLE DEFAULT MODE

BACKGROUND OF THE INVENTION

1. Field of the Invention

The present invention relates to a device driver for operating a device in a plurality of operational modes. More particularly, the present invention concerns a printer driver for a printing system in which system resources are detected and a default printing mode is set based on the detected resources.

2. Description of the Related Art

Conventional printer drivers provide various printing modes, such as a high-speed, lower-quality mode, and a low-speed, higher-quality mode. Such printer drivers also provide a user with a means to select from the various modes. In this regard, once a user issues a print command, a conventional printer driver causes a printing system to display a printer driver window which lists the available printing modes and allows the user to select therefrom.

Upon initial display of the printer driver window, one of the printing modes is indicated as being selected. The thus-indicated mode is referred to as a default mode, and is determined according to a hard-coded instruction within the printer driver. As such, if a user selects an "OK" or "Print" button on the printer driver window without selecting a printing mode, printing is performed in accordance with the default mode.

In selecting from the available printing modes, a user commonly takes into account factors such as a desired print speed, a desired print quality, and processing capabilities of the printing system. However, some less-sophisticated users simply select the OK or Print button immediately upon display of the printer driver window. Therefore, these users always print using the default printing mode. As a result, printing is often performed in a mode inappropriate to the less-sophisticated user's needs.

Alternatively, some conventional software applications first determine whether system resources are sufficient to perform an operation in a particular mode, and, if not, perform the operation in a mode different from the particular mode. Although these applications attempt to provide an appropriate operational mode, they do not provide a user with a choice of operational mode, thereby reducing system flexibility.

SUMMARY OF THE INVENTION

The present invention addresses the foregoing by providing a system which possesses the advantages of each of the above-described systems. More specifically, the present invention provides a user-modifiable operational mode which is initially set to a default operational mode, the default operational mode being determined based on system resources.

As a result of the foregoing, the default operational mode is more likely to be an appropriate operational mode than that provided by conventional systems. Moreover, the present invention also provides the user with the ability to select an operational mode different from the default mode.

In this regard, the present invention concerns a device driver for use in a computer system, including process steps to detect data corresponding to at least one system resource of the computer system, to determine a default operational mode from a plurality of operational modes of a device based on the data corresponding to at least one system resource, and to provide a user interface for selecting an operational mode from the plurality of operational modes.

In one embodiment, the user interface is a graphical user interface, and the process steps include a receiving step to receive an instruction to display the user interface, and a displaying step to display, in response to the instruction, the user interface having the default operational mode selected. In another embodiment, the at least one detected system resource includes a clock speed of a system central processing unit (CPU) and a size of a system random access memory (RAM).

In yet another embodiment, the data corresponding to the at least one system resource is detected during installation of the device driver and the determining and providing steps are executed during execution of the device driver.

The present invention also concerns process steps of a device driver for use in a computer system, including a detecting step to detect a selection of a new device operational mode different from a default device operational mode, a setting step to set the new device operational mode as a new default device operational mode, a first determining step to determine whether an instruction to restore the default device operational mode has been received, a second determining step to determine, in response to the instruction, a default device operational mode from a plurality of operational modes of a device, and a setting step to set the determined default device operational mode as the default device operational mode.

By virtue of the foregoing aspect of the present invention, a default operational mode adapts in accordance with a user's interaction with a printer driver. Accordingly, the invention provides the user with flexibility to change a default mode and to maintain the changed default mode during subsequent printing. This aspect of the invention also allows the user to restore a default mode to a mode appropriate to a particular computer system without requiring user knowledge of which mode is most appropriate.

This brief summary has been provided so that the nature of the invention may be understood quickly. A more complete understanding of the invention can be obtained by reference to the following detailed description of the preferred embodiments thereof in connection with the attached drawings.

DETAILED DESCRIPTION OF THE PREFERRED EMBODIMENTS

Figure 1:
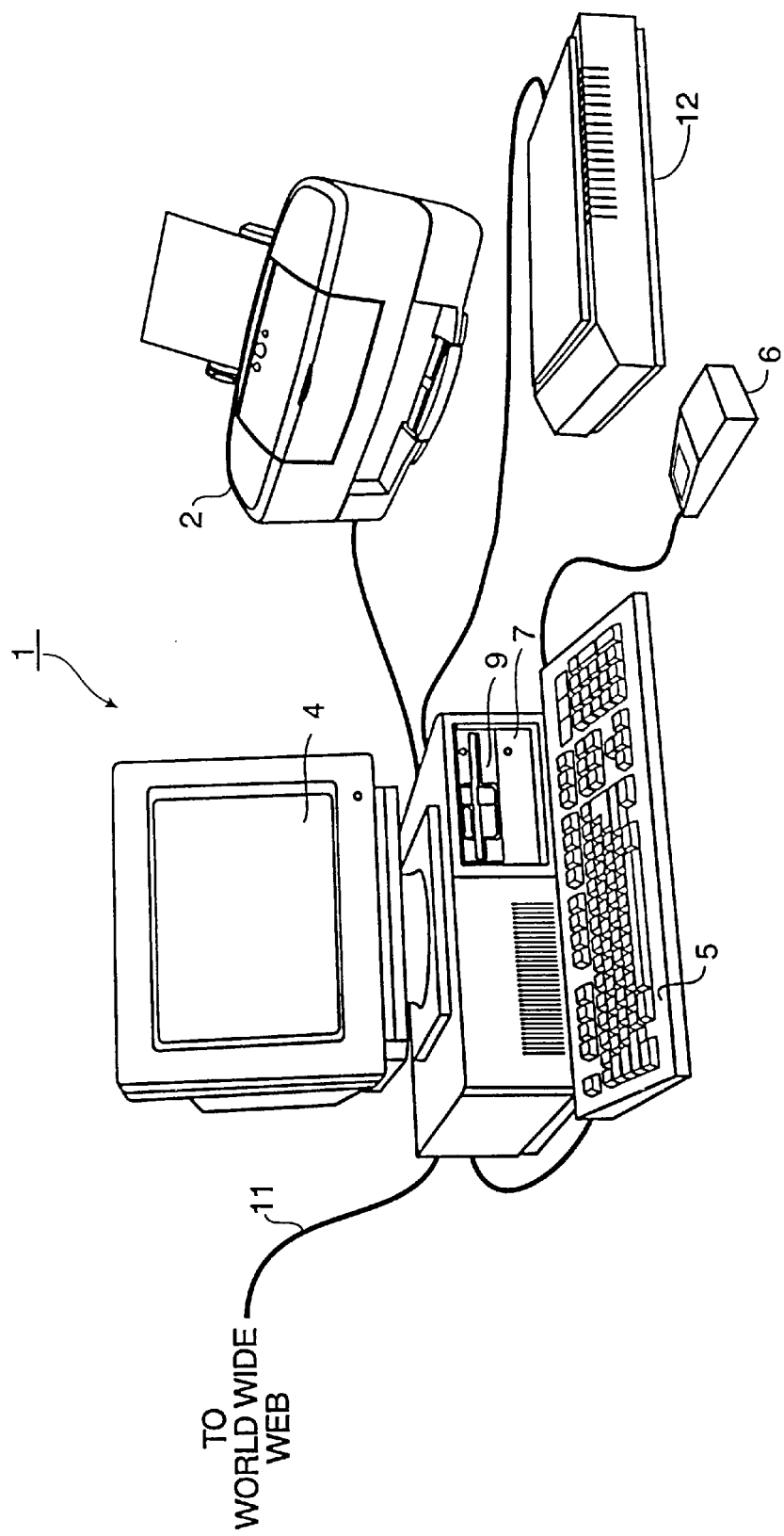
FIG. 1 is a view showing an outward appearance of a computing system embodying the present invention.

FIG. 1 is an outward view showing representative computing equipment embodying the present invention. Personal computer 1 is preferably an IBM PC-compatible computer having a windowing environment, such as Microsoft Windows98®. Provided with computer 1 is ink jet printer 2 adapted to print color images using inks of subtractive color components, such as cyan, magenta, yellow, and black. Other types of printers, such as laser printers, thermal printers, dot matrix printers, or the like may also be used in practicing the present invention.

Also provided with computer 1 are display screen 4 for displaying images to a user, keyboard 5 for entering text data and user commands, and pointing device 6 for selecting and for manipulating objects displayed on display screen 4.

Computer 1 includes a computer-readable memory medium such as fixed disk 7 for storing computer-readable data. Fixed disk 7 stores, among other files, application programs by which computer 1 generates files, manipulates files, and stores those files on fixed disk 7, displays data in those files to a user via display screen 4, and prints data in those files via printer 2. Fixed disk 7 also stores an operating system which, as noted above, is preferably a windowing operating system.

Device drivers are also stored in disk 7. At least one of the stored device drivers is a printer driver comprising computer-executable process steps according to the present invention. The printer driver provides a software interface to firmware in printer 2, thereby facilitating data transfer between computer 1 and printer 2.

Floppy disk drive 9 provides a means whereby computer 1 can access a computer-readable floppy disk storing data files, application program files, computer-executable process steps embodying the present invention, or the like. A similar CD-ROM interface (not shown) may be provided with computer 1 through which computer 1 can access application program files, device driver files, and data files stored on a CD-ROM.

Also provided with computer 1 is World Wide Web connection 11, which may be a modem connection, an integrated services digital network (ISDN) connection, or the like, through which computer 1 can download data files, image files, application program files, and computer-executable process steps embodying the present invention from the World Wide Web.

Image files may be obtained via scanner 12, which is also connected to computer 1.

Figure 2:
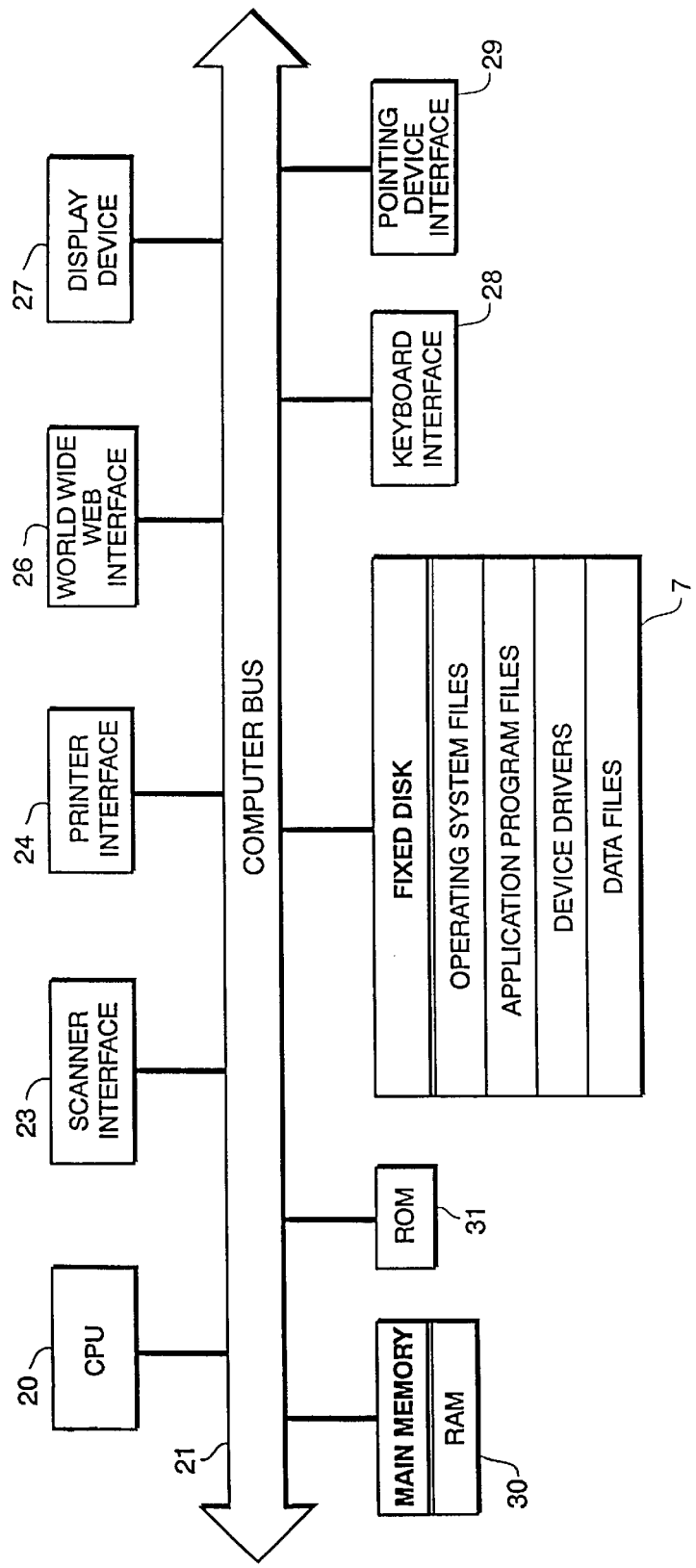
FIG. 2 is a block diagram of the functional architecture of the FIG. 2 computing system.

FIG. 2 is a block diagram showing the internal functional architecture of computer 1. As shown in FIG. 2, computer 1 includes CPU 20 for executing computer-executable process steps.

CPU 20 interfaces to computer bus 21. Also interfaced to computer bus 21 are scanner interface 23, printer interface 24, World Wide Web interface 26, display device interface 27, keyboard interface 28, pointing device interface 29, and fixed disk 7.

As described above, fixed disk 7 includes a section for storing operating system program files, a section for storing application program files, and a section for storing device drivers such as a printer driver to interface to printer 2. Each of these types of files are preferably stored on fixed disk 7 using an installation program. For example, computer-executable process steps of an installation program are executed by CPU 20 to copy files for an application program from a computer-readable medium to appropriate directories of fixed disk 7 and to update various operating system files so that the application program can be properly executed by CPU 20 in computer 1.

Fixed disk 7 also includes a section for storing data files such as bitmap color image files for printing via printer 2.

A random access main memory ("RAM") 30 also interfaces to computer bus 21 to provide CPU 20 with access to memory storage. In particular, when executing stored computer-executable process steps from disk 7 (or other storage media such as media accessed via floppy disk drive 9 or World Wide Web connection 11), CPU 20 stores those process steps in RAM 30 and executes the stored process steps out of RAM 30.

Read only memory ("ROM") 31 stores invariant instruction sequences such as start-up instruction sequences or basic input/output operating system (BIOS) sequences for operation of keyboard 5.

With specific regard to the present invention, most windowing application programs provide a Print function, using which a particular image file, text file, or other type of data file processed by the application can be printed. Depending upon the application, a user can issue a command to execute the Print function using keyboard 5 and/or pointing device 6. Upon receiving such a command, the application presents a Print window to the user via display screen 4.

Figure 3:
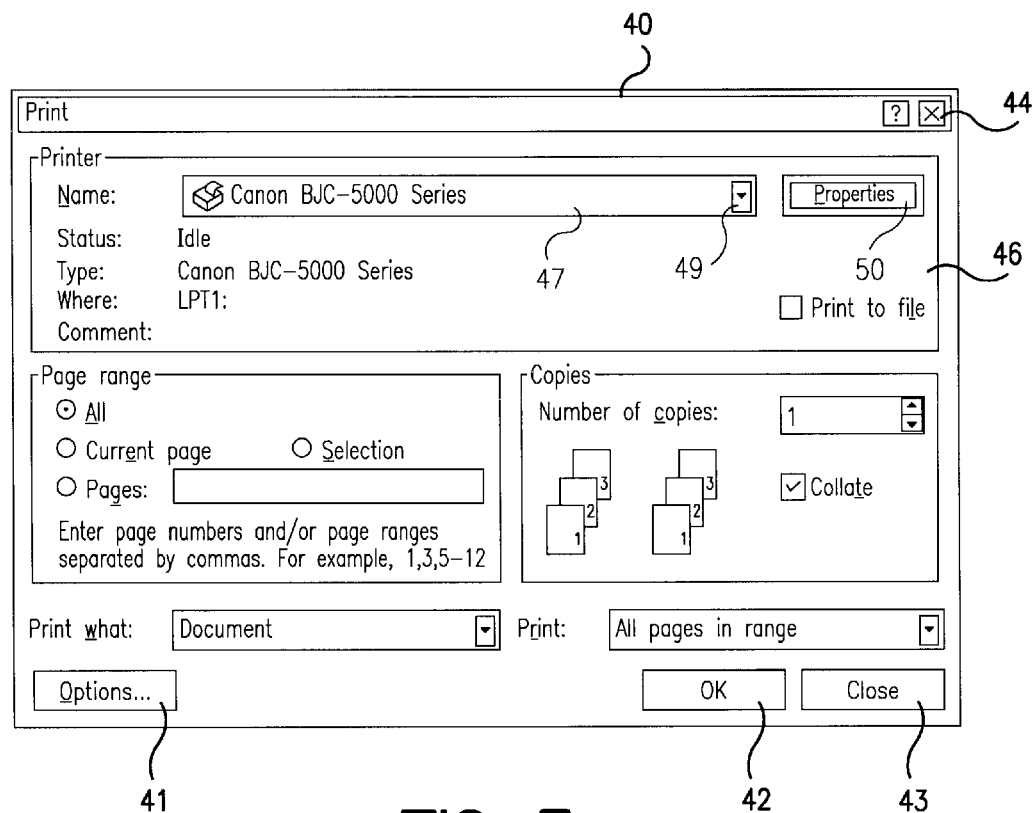
FIG. 3 is a view of a Print window for use in conjunction with the present invention.

FIG. 3 shows Print window 40, which is displayed on display screen 4 in response to a Print command. As shown, Print window 40 provides a user with several selectable options for printing a selected file. Additional options may be obtained by user selection of Options icon 41, in response to which the application program displays a window of additional options. Once a user is satisfied with the options selected in Print window 40, OK button 42 can be selected to commence printing in accordance with the selected options. Alternatively, Close button 43 or icon 44 can be selected to dismiss Print window 40 without printing.

In more detail, Print window 40 contains Printer area 46, through which a user may set options particular to a selected printer. In this regard, Printer Name area 47 indicates a type of printer which is to be used to print the selected file. Using pull-down button 49, other printer models may be selected for display in Printer Name area 47. Printer area 46 also includes information regarding the status of the selected printer and printer interface 24 connecting computer 1 to printer 2.

Figure 4:
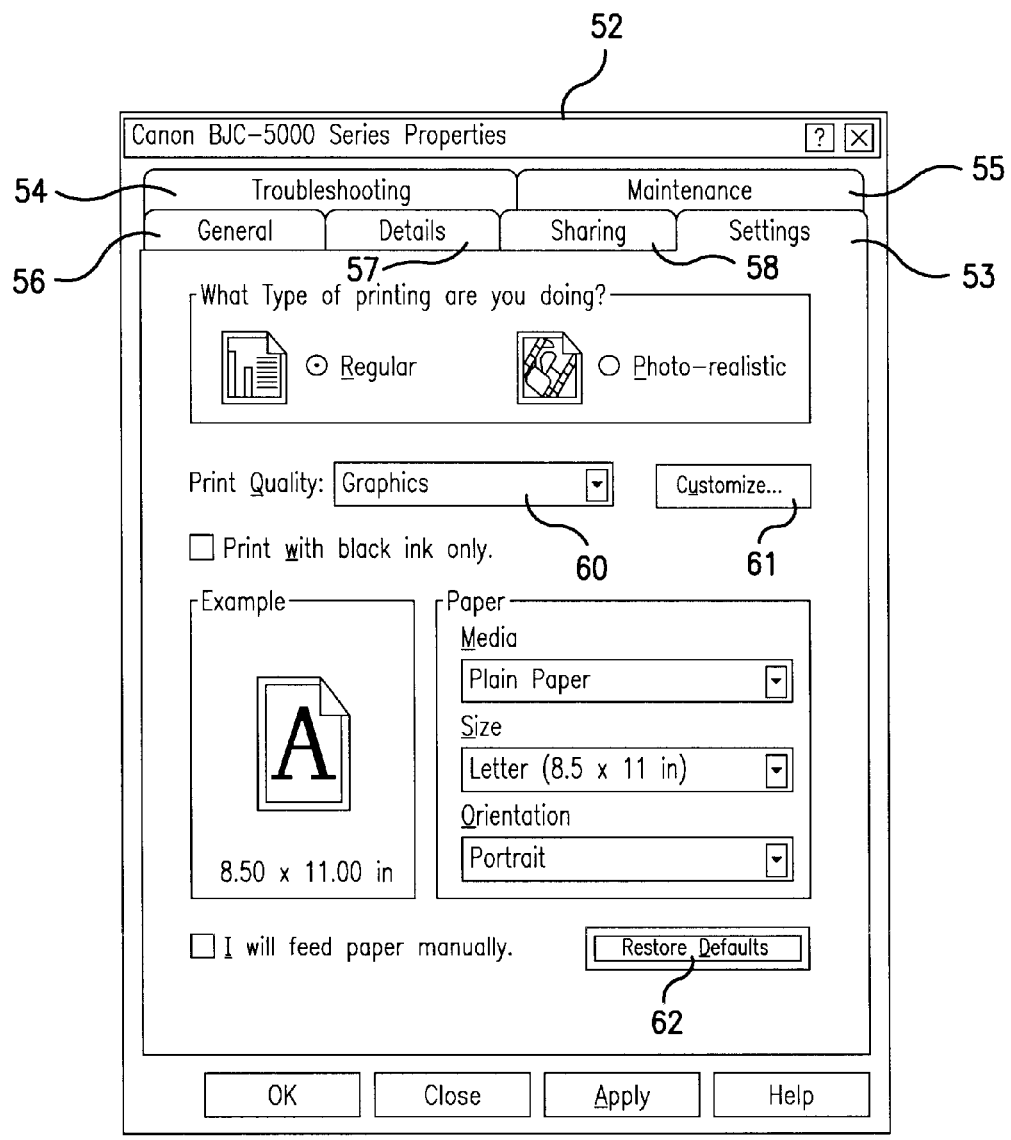
FIG. 4 is a view of a printer Properties window according to the present invention.

Printing options particular to the selected printer can be accessed by selecting Properties button 50 of Print window 40. Upon selection of Properties button 50, Properties window 52 of FIG. 4 is displayed on display screen 4. As shown, Properties window 52 contains a property sheet having several property pages, such as Settings properties page 53. Also available through window 52 are Troubleshooting property page 54, Maintenance property page 55, General property page 56, Details property page 57, and Sharing property page 58.

It should be noted that, in a preferred embodiment of the invention, a printer driver for printer 2 includes computer-executable process steps to display Properties window 52. Advantageously, such an arrangement allows a printer driver to provide all printer-specific support and thereby reduce an amount of printing functionality required by application programs.

Settings property page 53 provides an interface through which a user may select from among several printing modes. In particular, Settings properties page 53 includes Print Quality selection area 60 for selecting a print quality mode. In this regard, Customize button 61 provides an interface to customize the print quality mode selected in selection area 60. Also shown on Settings page 53 is Restore Defaults button 62, the function of which will be described below.

Figure 5:
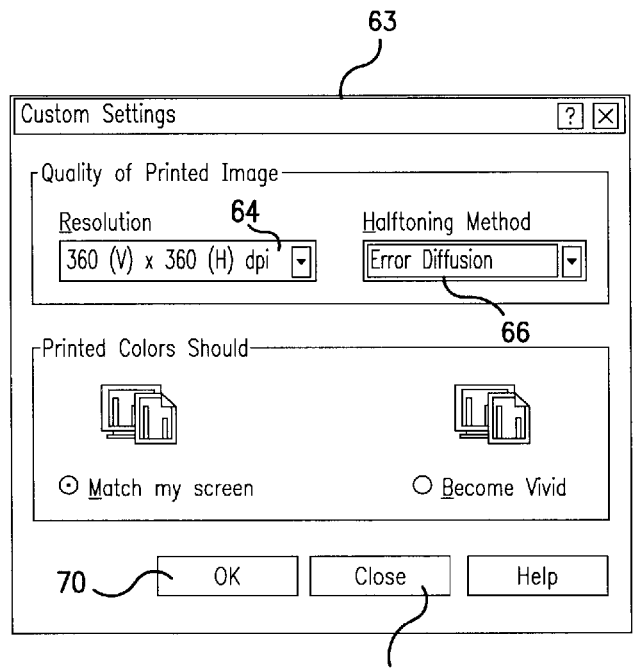
FIG. 5 is a view of a Custom Settings window according to the present invention.

FIG. 5 shows Custom Settings window 63, which is displayed on display screen 4 in response to selection of Customize button 61. As discussed above with respect to window 52, a printer driver according to the present invention preferably includes computer-executable process steps to display Custom Settings window 63.

Custom Settings window 63 includes Resolution selection area 64 and Halftoning Method selection area 66 for customizing the mode selected in Print Quality selection area 60. Upon initial display of Custom Settings window 63, a default resolution is displayed in Resolution selection area 64, and a default halftoning method is displayed in Halftoning Method selection area 66. OK button 70 is used to select the printing modes specified in areas 64 and 66, and Cancel button 71 can be selected to dismiss Custom Settings window 63 and to ignore any changes made to Custom Settings window 63.

Figure 6:
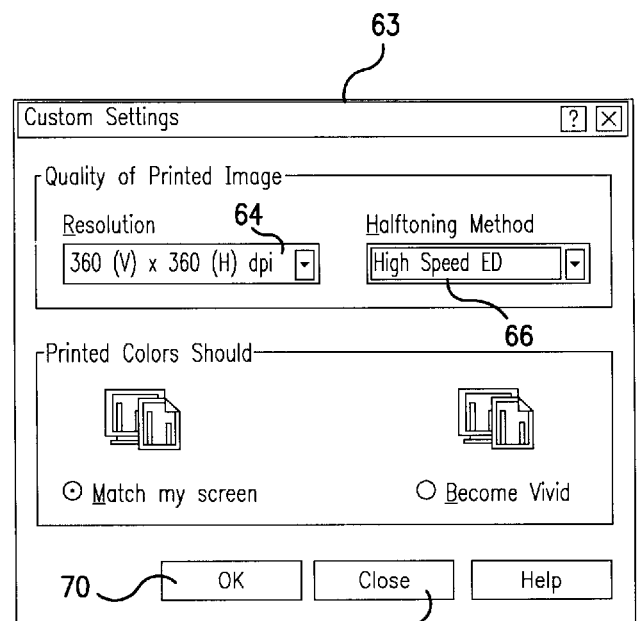
FIG. 6 is a view of a Custom Settings window according to the present invention.

FIG. 6 shows a second version of Custom Settings window 63. FIG. 6 is identical to FIG. 5 except that a different halftoning method is listed in Halftoning Method selection area 66.

Figure 7A:
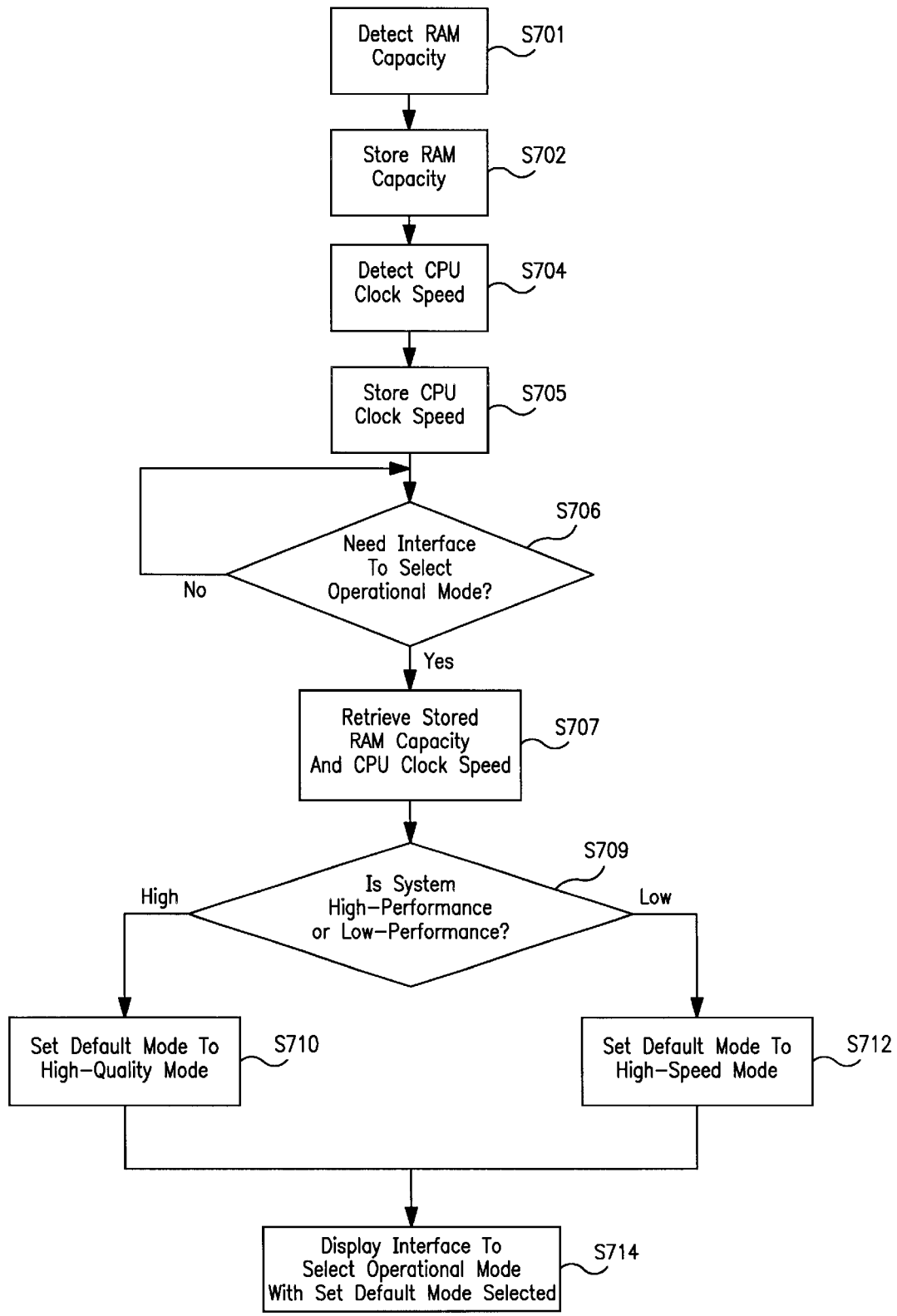
FIG. 7A is a flow diagram of computer-executable process steps to provide an adaptable default operational mode according to the present invention.

FIG. 7A is a flow diagram of computer-executable process steps according to the present invention. Preferably, the computer-executable process steps described in FIG. 7A are loaded into RAM 30 and executed therefrom by CPU 20.

Generally, the FIG. 7A process steps include a detecting step to detect data corresponding to at least one system resource of the computer system, a determining step to determine a default operational mode from a plurality of operational modes of a device based on the data corresponding to at least one system resource, and a providing step to provide a user interface for selecting an operational mode from the plurality of operational modes.

More particularly, flow begins at step S701, in which a capacity of RAM 30 is detected. Such detection can be performed by any of several methods known to those skilled in the art. Next, in step S702, the detected RAM capacity is stored. The detected capacity may be stored in a system file such as the win.ini file of the Windows98® operating system, or in a windows registry. If stored in the windows registry, it is preferable for the RAM capacity to be stored in a directory dedicated to the printer driver, rather than a common system directory. Of course, the RAM capacity may be stored elsewhere in computer 1 while keeping with the present invention.

In steps S704, a clock speed of CPU 20 is detected. As stated above with respect to step S701, the clock speed may be detected using any of several techniques known in the art. Next, in step S705, the detected CPU clock speed is stored. The CPU clock speed may be stored in either a windows system file or in the windows registry as described above, or elsewhere within computer 1.

The steps of FIG. 7A pause at step S706 until an interface to select an operational mode is needed. With respect to FIG. 4, it is determined in step S706 that an interface to select a Graphics operational mode is needed upon user selection of Customize button 61. Flow thereafter continues to step S707, wherein the stored RAM capacity and CPU clock speed are retrieved.

In step S709, it is determined whether, based on the stored RAM capacity and CPU clock speed, computer 1 is a high-performance or a low-performance system. In the preferred embodiment, a system having a RAM capacity of less than 32 megabytes (ME) or a CPU clock speed less than 166 megahertz (MHz) is determined in step S709 to be a low-performance system. Otherwise, the system is determined to be a high-performance system.

Depending upon the determination in step S709, flow proceeds to step S710 or S712, wherein a default mode corresponding to the operational mode of step S706 is set to a high-quality mode or a high-speed mode, respectively. In the present example, error diffusion processing provides high-quality graphics but requires a significant amount of computing resources. Accordingly, error diffusion processing often takes an unsatisfactory amount of time to execute using low-performance systems. As a result, error diffusion processing is set as a default mode in step S710 in a case of a is high-performance system.

On the other hand, high-speed error diffusion processing is not as computing-intensive as error diffusion processing. Therefore, although high-speed error diffusion processing does not provide graphics quality such as that provided by error diffusion processing, high-speed error diffusion is often desirable for use with low-performance systems. Accordingly, high-speed error diffusion processing is set as a default mode in step S712 in a case of a low-performance system.

Next, in step S714, an interface to select the operational mode of step S706 is displayed having the set default mode selected. In this regard, FIG. 5 shows Custom Settings window 63 as initially displayed upon selection of Customize button 61 in a high-performance computer. As shown, the default operational mode for a high-performance computer, error diffusion, is selected. On the contrary, FIG. 6 shows Custom Settings window 63 as initially displayed in step S714 in a case that computer 1 is a low-performance system. Accordingly, the selected default mode is high-speed error diffusion.

It should be noted that the foregoing default modes are preferably selected in Custom Settings window 63 only upon an initial display of Custom Settings window 63. In this regard, in a case that the default mode displayed in Halftoning Method selection area 66 is changed from the default mode to a new mode and OK button 70 is selected, Customs Settings window 63 will display the new operational mode in Halftoning Method selection area 66 upon a subsequent display of Custom Settings window 63.

On the other hand, if the operational mode in Halftoning Method selection area 66 is changed from the default mode and Cancel button 71 is selected, the default mode will again appear in Halftoning Method selection area 66 upon subsequent display of Custom Settings window 63.

Advantageously, a printer driver according to FIG. 7A provides an adaptable default mode which is based on system performance and which can be changed by a user. Moreover, since such a printer driver executes step S701 and step S704 each time it is invoked, changes in RAM capacity or CPU clock speed of computer 1 due to hardware upgrades or downgrades can be detected and default modes adapted accordingly.

It should be noted that, rather than storing the detected RAM capacity and detected CPU clock speed as described above, the determination of whether computer 1 is a high-performance or a low-performance system can be performed before step S706, and a "high" or "low" flag can be stored depending on the determination. In such a case, step S707 simply consist of retrieval of the stored flag.

Figure 7B:
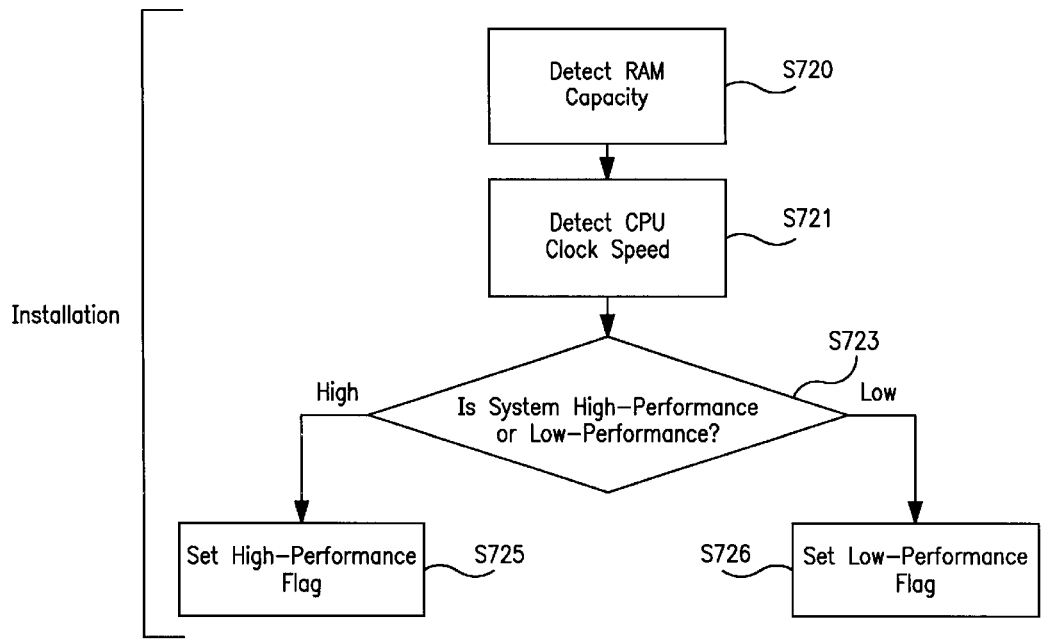
FIG. 7B and FIG. 7C are flow diagrams of computer-executable process steps to provide an adaptable default operational mode according to the present invention.
Figure 7C:
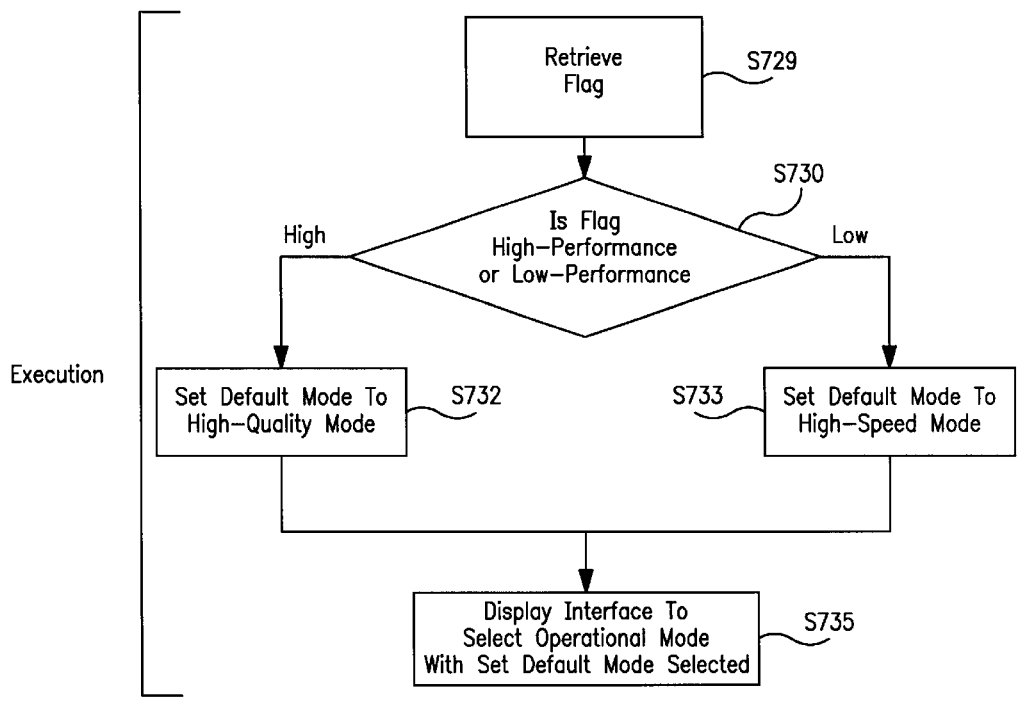

FIG. 7B and FIG. 7C are flow diagrams of process steps corresponding to another embodiment of the present invention. The process steps are preferably embodied in computer-executable process steps stored in fixed disk 7, loaded into RAM 30, and executed by CPU 20. More particularly, the process steps of FIG. 7B are embodied in an installation program and executed to install a printer driver. In this regard, the process steps of FIG. 7C are embodied in the installed printer driver and are therefore executed during execution of the printer driver.

Initially, step S720 and step S721 of FIG. 7B respectively correspond to step S701 and S704 of FIG. 7A, and explanations thereof are therefore omitted. Flow proceeds from step S721 to step S723, wherein, as described above with respect to step S709, it is determined whether computer 1 is a high-performance system or a low-performance system. If high-performance, flow continues to step S725, in which a "high-performance" flag is stored in the win.ini file, the windows registry, or elsewhere in computer 1. If the system is determined in step S723 to be a low-performance system, flow continues to step S726, wherein a low-performance flag is stored in the win.ini file, the windows registry, or elsewhere in computer 1.

The steps of FIG. 7C are embodied in a printer driver, and are therefore executed during execution of the printer driver. Flow begins at step S729, in which the flag stored in step S725 or step S726 of FIG. 7B is retrieved. If, in step S730, the flag is determined to indicate a high-performance system, flow proceeds to step S732. If the flag is determined to indicate a low-performance system, flow proceeds to step S733. Flow then continues from step S732 or step S733 to step S735. Steps S732, S733, and S735 roughly correspond to steps S710, S712, and S714 of FIG. 7A, therefore descriptions of these steps can be found above.

By virtue of the FIG. 7B and FIG. 7C process steps, it is not necessary to detect system resources and determine system performance each time a printer driver is executed. Rather, the printer driver simply references a stored flag to determine system performance.

As an alternative or an addition to the FIG. 7B steps, a user can be provided with an interface during installation of a driver, through which the user may specify whether computer 1 is a high-performance system or a low-performance system. If specified, a corresponding flag is stored in step S725 or step S726. Such an arrangement can avoid steps S720 and S721 and also provides a user with greater control over operation of the system.

Figure 8:
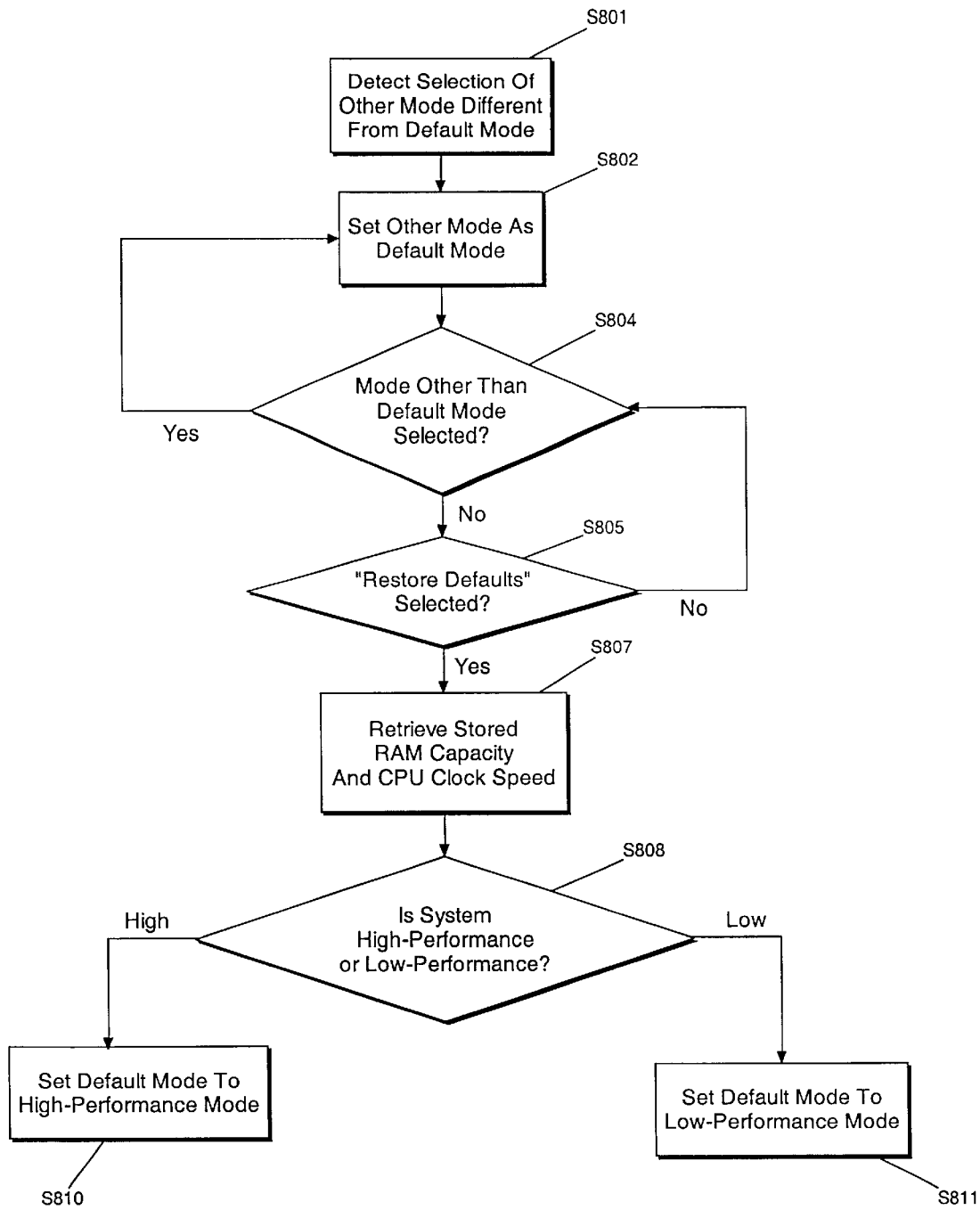
FIG. 8 is a flow diagram of computer-executable process steps to provide an adaptable default operational mode according to the present invention.

FIG. 8 is a flow diagram of computer-executable process steps of a printer driver according to another aspect of the present invention. The process steps of FIG. 8 are preferably embodied in computer-executable process steps executed out of RAM 30 by CPU 20.

Briefly, the FIG. 8 process steps include a detecting step to detect a selection of a new device operational mode different from a default device operational mode, a setting step to set the new device operational mode as a new default device operational mode, a first determining step to determine whether an instruction to restore the default device operational mode has been received, a second determining step to determine, in response to the instruction, a default device operational mode from a plurality of operational modes of a device, and a setting step to set the determined default device operational mode as the default device operational mode.

Specifically, a selection of an operational mode different from a default mode is detected in step S801. For example, as described above, FIG. 5 shows Custom Settings window 63 as initially displayed within a high-performance computer. In a case that the error diffusion halftoning method, displayed in Halftoning Method selection area 66, is changed to high-speed error diffusion and OK button 70 is selected, it is detected in step S801 that a mode different from the default mode has been selected.

Next, in step S802, the selected other mode is set as the default mode. In the above example, the high-speed error diffusion halftoning method is set as the default mode. By virtue of step S802, the newly-set default mode will be displayed in Halftoning Method selection area 66 upon each subsequent display of Custom Settings window 63.

Flow continues from step S802 to step S804, wherein it is determined, in a manner such as that described in step S801, whether a mode other than the current default mode has been selected. If so, flow returns to step S802. If the determination in step S804 is negative, flow continues to step S805, in which it is determined whether Restore Defaults button 62 of FIG. 4 has been selected. If Restore Defaults button 62 has not been selected, flow returns to step S804 and continues as described above.

If Restore Defaults button 62 is selected in step S805, flow proceeds to step S807, wherein the RAM capacity and CPU clock speed stored in steps S702 and S705 of FIG. 7A are retrieved. Next, flow proceeds to steps S808, S810, and S811 as described above with respect to steps S709, S710, and S712, respectively.

As described with respect to FIG. 7B and FIG. 7C, step S807 may be eliminated in a case that a flag indicative of system performance is stored within computer 1. In this case, the flag is simply checked in step S808 to determine whether to proceed to step S810 or step S811.

By virtue of the foregoing process steps, a default operational mode adapts based on a user's interaction with a printer driver. Accordingly, the FIG. 8 process steps provide a user with flexibility to change a default mode and to maintain the changed default mode during subsequent printing. Moreover, the FIG. 8 process steps allow a user to restore a default mode to a mode appropriate to a particular computer system without requiring user knowledge of which mode is most appropriate.

It should be understood that, although the foregoing description concerns modes for halftoning during graphics-quality printing, the foregoing process steps may be used to provide an adaptable default for any operational mode or modes. It should also be understood that the present invention is not limited to the particular windowing protocol shown in FIG. 3 to FIG. 6.

In addition, a default mode of operation may be determined based on data corresponding to system resources other than RAM capacity or CPU clock speed, such as number of currently-executing applications, cache size, or the like.

Finally, while the present invention is described above with respect to what is currently considered its preferred embodiments, it is to be understood that the invention is not limited to that described above. To the contrary, the invention is intended to cover various modifications and equivalent arrangements included within the spirit and scope of the appended claims.

What is claimed is:

1. A computer-readable medium storing computer-executable process steps of a printer driver for use in a computer system, the steps comprising:
   a receiving step of receiving a command input by a user to initiate the printer driver for processing of data to be processed;
   a detecting step of detecting data corresponding to at least one system resource of the computer system in response to the received command;
   a determining step of determining a default operational mode from a plurality of operational modes of the printer driver based on the detected data corresponding to the detected at least one system resource;

a setting step of automatically setting the determined default operational mode of the printer driver as the default operational mode of the printer driver;

a providing step of providing a user interface for confirming the set default operational mode of the printer driver or for selecting an operational mode of the printer driver different from the set default operational mode of the printer driver from the plurality of operational modes of the printer driver; and an executing step of executing the printer driver to process the data to be processed based on the operational mode selected or the default operational mode confirmed by the user.

2. A computer-readable medium according to claim 1, wherein the at least one system resource comprises a system CPU clock speed.

3. A computer-readable medium according to claim 1, wherein the at least one system resource comprises a system random access memory capacity.

4. A computer-readable medium according to claim 1, wherein the user interface is a graphical user interface.

5. A computer-readable medium according to claim 4, the process steps further comprising:
a receiving step of receiving an instruction to display the user interface; and
a displaying step of displaying, in response to the instruction, the user interface having the default operational mode selected.

6. A computer-readable medium according to claim 1, wherein the detection step comprises a providing step to provide a user interface to receive data corresponding to the at least one system resource.

7. A method for a printer driver, comprising the steps of:
receiving a command input by a user to initiate the printer driver for processing of data to be processed;
detecting data corresponding to at least one system resource of the computer system in response to receiving the command to initiate the printer driver;
determining a default operational mode from a plurality of operational modes of the printer driver based on the detected data corresponding to the at least one system resource;
automatically setting the determined default operation mode of the printer driver as the default operational mode of the printer driver;
providing a user interface for confirming the set default operational mode of the printer driver or for selecting an operational mode of the printer driver different from the set default operational mode of the printer driver from the plurality of operational modes of the print driver; and
executing the printer driver to process the data to be processed based on the operational mode selected or the default operational mode confirmed by the user.

8. A method according to claim 7, wherein the at least one system resource comprises a system CPU clock speed.

9. A method according to claim 7, wherein the at least one system resource comprises a system random access memory capacity.

10. A method according to claim 7, wherein the user interface is graphical user interface.

11. A method according to claim 10, further comprising:
receiving an instruction to display the user interface; and
displaying, in response to the instruction, the user interface having the default operational mode selected.

12. A method according to claim 7, wherein the detecting step comprises providing a user interface to receive data corresponding to the at least one system resource.

13. A computer-readable medium storing computer-executable process steps for a printer driver for use in a computer system, the steps comprising:
an installing step of installing the printer driver in the computer system, the installing step comprising:
a providing step of providing a user interface for selecting a performance level of the computer system; and
a storing step of storing data corresponding to the selected performance level; and
an executing step of executing the printer driver, the executing step comprising:
a receiving step of receiving a command input by a user to initiate the printer driver for processing of data to be processed;
a determining step of determining, in response to the received command to initiate the printer driver, a default operational mode from a plurality of operational modes of the printer driver based on the data corresponding to the selected performance level;
a setting step of automatically setting the determined default operational mode of the printer driver as the default operational mode of the printer driver;
a providing step of providing a user interface for confirming the set default operational mode of the printer driver or for selecting an operational mode of the printer driver different from the set default operational mode of the printer driver from the plurality of operational modes of the printer driver; and
an executing step of executing the printer driver to process the data to be processed based on the operational mode selected or the default operational mode confirmed by the user.

14. A computer-readable medium according to claim 13, wherein the user interface is a graphical user interface.

15. A computer-readable medium according to claim 14, the process steps further comprising:
a receiving step of receiving an instruction to display the user interface; and
a displaying step of displaying, in response to the instruction, the user interface having the default operational mode selected.

16. A method for a printer driver for use in a computer system, comprising:
installing the printer driver in the computer system, the installing step comprising:
providing a user interface for selecting a performance level of the computer system; and
storing data corresponding to the selected performance level; and
executing the printer driver, the executing step comprising:
receiving a command input by a user to initiate the printer driver for processing of data to be processed;
determining, in response to the received command to initiate the printer driver, a default operational mode from a plurality of operational modes of the printer driver based on the data corresponding to the selected performance level;
automatically setting the determined default operational mode of the printer driver as the default operational mode of the printer driver;
providing a user interface for confirming the set default operational mode of the printer driver or for selecting an operational mode of the printer driver different from the set default operational mode of the printer driver from the plurality of operational modes of the printer driver; and executing the printer driver to process the data to be processed based on the operational mode selected or the default operational mode confirmed by the user.

17. A method according to claim 16, wherein the user interface is a graphical user interface.

18. A method according to claim 17, further comprising:

receiving an instruction to display the user interface; and displaying, in response to the instruction, the user interface having the default operational mode selected.

19. A computer-readable medium storing computer-executable process steps for a printer driver for use in a computer system, the steps comprising:

a receiving step of receiving a command input by a user to initiate the printer driver for processing of data to be processed;

a first detecting step of detecting a selection of a new operational mode of the printer driver different from a default operational mode of the printer driver;

a setting step of setting the new operational mode of the printer driver as a new default operational mode of the printer driver;

a first determining step of determining whether an instruction to restore the default operational mode of the printer driver has been received;

a second detecting step of detecting, in response to the instruction to restore the default operational mode of the printer driver, data corresponding to at least one system resource of the computer system;

a second determining step of determining a default operational mode from a plurality of operational modes of the printer driver based on the detected data corresponding to the at least one system resource of the computer system;

a setting step of automatically setting the determined default operational mode of the printer driver as the default operational mode of the printer driver; and an executing step of executing the printer driver to process the data to be processed based on the set default operational mode of the printer driver.

20. A computer-readable medium storing computer-executable process steps for a printer driver for use in a computer system, the steps comprising:

a receiving step of receiving a command input by a user to initiate the printer driver for processing of data to be processed;

a first detecting step of detecting a selection of a new operational mode of the printer driver different from a default operational mode of the printer driver;

a setting step of setting the new operational mode of the printer driver as a new default operational mode of the printer driver, a first determining step of determining whether an instruction to restore the default operational mode of the printer driver has been received;

a second detecting step of detecting, in response to the instruction to restore the default operational mode of the printer driver, data corresponding to a selected performance level of the computer system;

a second determining step of determining a default operational mode from a plurality of operational modes of the printer driver based on the detected data corresponding to the selected performance level of the computer system;

a setting step of automatically setting the determined default operational mode of the printer driver as the default operational mode of the printer driver; and an executing step of executing the printer driver to process the data to be processed based on the set default operational mode of the printer driver.

21. A method for a printer driver for use in a computer system, comprising:

a receiving step of receiving a command input by a user to initiate the printer driver for processing of data to be processed;

a first detecting step of detecting a selection of a new operational mode of the printer driver different from a default operational mode of the printer driver;

a setting step of setting the new operational mode of the printer driver as a new default operational mode of the printer driver;

a first detecting step of determining whether an instruction to restore the default operational mode of the printer driver has been received;

a second detecting step of detecting, in response to the instruction to restore the default operational mode of the printer driver, data corresponding to at least one system resource of the computer system;

a second determining step of determining a default operational mode from a plurality of operational modes of the printer driver based on the detected data corresponding to at least one system resource of the computer system;

a setting step of automatically setting the determined default operational mode of the printer driver as the default operational mode of the printer driver; and an executing step of executing the printer driver to process the data to be processed based on the set default operational mode of the printer driver.

22. A method for a printer driver for use in a computer system, comprising:

a receiving step of receiving a command input by a user to initiate the printer driver for processing of data to be processed;

a first detecting step of detecting a selection of a new operational mode of the printer driver different from a default operational mode of the printer driver;

a setting step of setting the new operational mode of the printer driver as a new default operational mode of the printer driver;

a first determining step of determining whether an instruction to restore the default operational mode of the printer driver has been received;

a second detecting step of detecting, in response to the instruction to restore the default operational mode of the printer driver, a selected performance level of the computer system;

a second determining step of determining a default operational mode from a plurality of operational modes of the printer driver based on the detected data corresponding to the selected performance level of the computer system;

a setting step of automatically setting the determined default operational mode of the printer driver as the default operational mode of the printer driver; and an executing step of executing the printer driver to process the data to be processed based on the set default operational mode of the printer driver.

* * * * *

UNITED STATES PATENT AND TRADEMARK OFFICE
CERTIFICATE OF CORRECTION

PATENT NO. : 6,762,771 B1
DATED : July 13, 2004
INVENTOR(S) : Niki et al.

It is certified that error appears in the above-identified patent and that said Letters Patent is hereby corrected as shown below:

Column 3,
Line 63, "Bach" should read -- Each --.

Column 6,
Line 17, "is" should be deleted.

Column 9,
Line 60, "graphical" should read -- a graphical --.

Signed and Sealed this

Eleventh Day of January, 2005

JON W. DUDAS
*Director of the United States Patent and Trademark Office*